US009462656B2

(12) United States Patent
Roberts et al.

(10) Patent No.: US 9,462,656 B2
(45) Date of Patent: Oct. 4, 2016

(54) LAMP BASE HAVING INTEGRAL SEMICONDUCTOR TRANSIENT PROTECTION DEVICE

(71) Applicant: GE LIGHTING SOLUTIONS, LLC, East Cleveland, OH (US)

(72) Inventors: Bruce Richard Roberts, Mentor-on-the Lake, OH (US); Thomas Alexander Knapp, Cleveland, OH (US); Timothy A. Taubert, Kirkland, OH (US)

(73) Assignee: GE LIGHTING SOLUTIONS, LLC, East Cleveland, OH (US)

( * ) Notice: Subject to any disclaimer, the term of this patent is extended or adjusted under 35 U.S.C. 154(b) by 6 days.

(21) Appl. No.: 14/572,224

(22) Filed: Dec. 16, 2014

(65) Prior Publication Data

US 2016/0174328 A1    Jun. 16, 2016

(51) Int. Cl.
*H05B 41/14*    (2006.01)
*H05B 33/08*    (2006.01)
*H01R 33/95*    (2006.01)

(52) U.S. Cl.
CPC .......... *H05B 33/0887* (2013.01); *H01R 33/95* (2013.01); *H05B 41/14* (2013.01)

(58) Field of Classification Search
CPC H05B 33/0887; F21V 23/009; F21V 21/005
USPC ............... 315/71, 75, 126, 127, 291; 307/66
See application file for complete search history.

(56) References Cited

U.S. PATENT DOCUMENTS

| 2,197,230 | A | * | 4/1940 | Waddell ............. H01H 35/2657 236/15 A |
| 3,464,048 | A | | 8/1969 | Stiles |
| 3,930,183 | A | * | 12/1975 | Harnden, Jr. ............ H01K 1/62 315/126 |
| 2004/0166720 | A1 | * | 8/2004 | Gibboney .............. H01R 33/22 439/375 |
| 2010/0127625 | A1 | | 5/2010 | Minarczyk et al. |
| 2011/0080740 | A1 | * | 4/2011 | Allen ...................... F21K 9/135 362/294 |
| 2011/0109164 | A1 | * | 5/2011 | Mohammed Suhura .................... H02J 9/065 307/66 |
| 2011/0193491 | A1 | * | 8/2011 | Choutov ............ H05B 33/0803 315/291 |
| 2011/0198996 | A1 | | 8/2011 | Lai |
| 2011/0242816 | A1 | * | 10/2011 | Chowdhury .......... F21V 29/004 362/294 |
| 2014/0340884 | A1 | * | 11/2014 | Hsia ...................... F21V 23/009 362/221 |
| 2014/0375211 | A1 | * | 12/2014 | Herrador ............ H05B 33/0809 315/119 |
| 2015/0054338 | A1 | * | 2/2015 | Mohammed Suhura .................... H02J 9/061 307/23 |

FOREIGN PATENT DOCUMENTS

EP    0957310 A1    11/1999

OTHER PUBLICATIONS

PCT Search Report and Written Opinion issued in connection with corresponding PCT Application No. PCT/US2015/058907 on Feb. 24, 2016.

\* cited by examiner

*Primary Examiner* — Douglas W Owens
*Assistant Examiner* — Syed M Kaiser
(74) *Attorney, Agent, or Firm* — GE Global Patent Operation; Peter T. DiMauro

(57) ABSTRACT

A lamp base including a neutral contact and a line contact, a semiconductor transient protection device having three terminals. The semiconductor transient protection device being an integral portion of the lamp base. A first terminal of the semiconductor transient protection device in mechanical and electrical contact with the neutral contact, a second terminal in mechanical and electrical contact with the line contact, and a third terminal in electrical contact with a lead-in wire. The semiconductor transient protection device configured to isolate the line contact from the neutral contact during a first line voltage input, and to provide a low-resistance shunt path between the line contact and the neutral contact during a second line voltage input.

9 Claims, 4 Drawing Sheets

LAMP BASE HAVING INTEGRAL SEMICONDUCTOR TRANSIENT PROTECTION DEVICE

BACKGROUND

Light-emitting diode (LED) lighting has application in both residential and commercial implementations. LED lighting provides low maintenance costs, long life and reduced power consumption compared to more conventional lighting technologies. Another energy saving lighting technology is compact fluorescent lamps (CFL).

Lamps having LED light sources or CFL light sources, however, can be susceptible to overvoltage transients. In particular, the electronics that drive the LED or CFL lamp needs to be protected from transients. A metal oxide varistor (MOV) can protect the LED, or CFL, lamp's driver electronics from overvoltage surges by clamping short duration voltage impulses.

In CFL and LED lamp products, there is a very limited space in which to place these protection products. In conventional implementations, the MOV component can be placed on the circuit board containing the driver electronics (across the AC power input) so as to provide the overvoltage clamping protection against lightning-related, switching, and/or other electrical transients.

DETAILED DESCRIPTION

In accordance with embodiments, the construction of the lamp base itself includes the MOV, or other transient protection device, as a replacement for the conventional insulator incorporated within the lamp base. A thermal limiting circuit (e.g., a fuse or resistor) is placed in series with the line input to open the input power in cases of internal short circuits.

Figure 1:
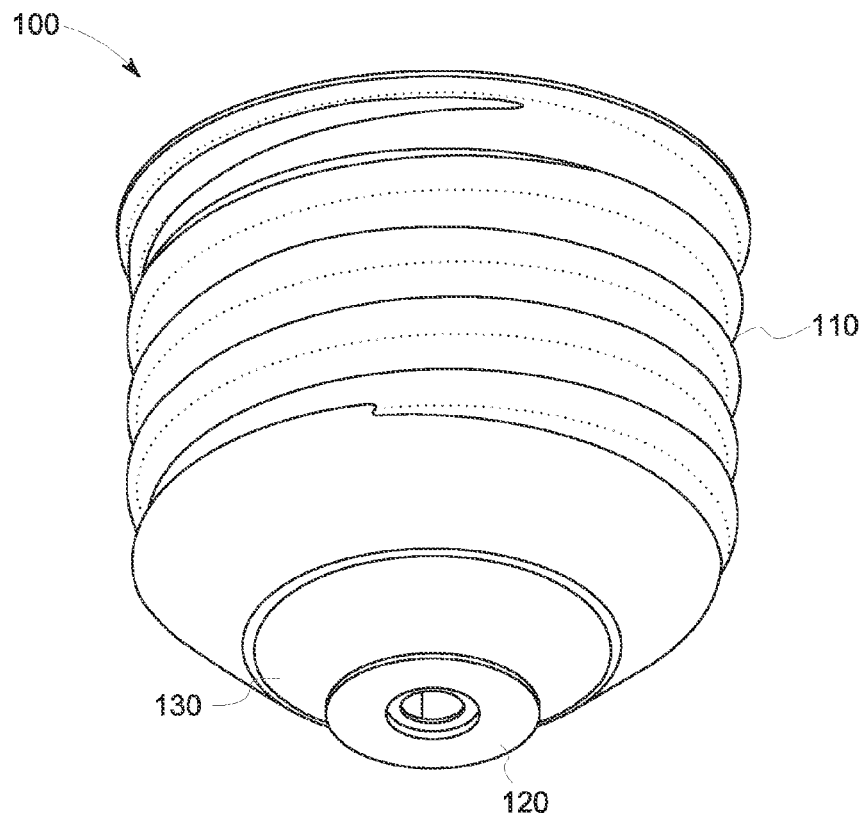
FIG. 1 depicts a perspective view of a conventional lamp base.

FIG. 1 depicts a bottom perspective view of conventional lamp base 100. The conventional lamp base can be, for example, an Edison base E27 or E15, or other type lamp base. Lamp base 100 includes neutral contact 110, which is typically a large conductive metal surface area around the circumference of the lamp base. Line contact 120 is typically a smaller conductive metal surface located at the bottom of the lamp base. Isolating the neutral and line contacts is insulator 130 located between the contacts. The conventional insulator is a non-semiconductor, ceramic insulator that both electrically and mechanically isolates the neutral and line contacts. A three-way lamp base includes an additional contact and isolator.

In accordance with embodiments, a semiconductor transient protection device replaces the conventional ceramic isolator in the lamp base construction. This semiconductor transient protection device can be an MOV, a transient voltage suppression (TVS) diode, and other voltage-clamping devices. In operation, at line voltage conditions the semiconductor transient protection device acts to isolate the neutral and line contacts of the lamp base from each other. In the presence of excess voltage across the line to neutral contacts, the semiconductor provides a shunt path between the line contact and the neutral contact to protect the driver electronics located within the lamp base. The amount of excess voltage on the line contact can be predetermined by parameters of a semiconductor element with the transient protection device. The shunt path provided by the semiconductor element can be a low resistance path based on the parameters of the semiconductor element.

Figure 2:
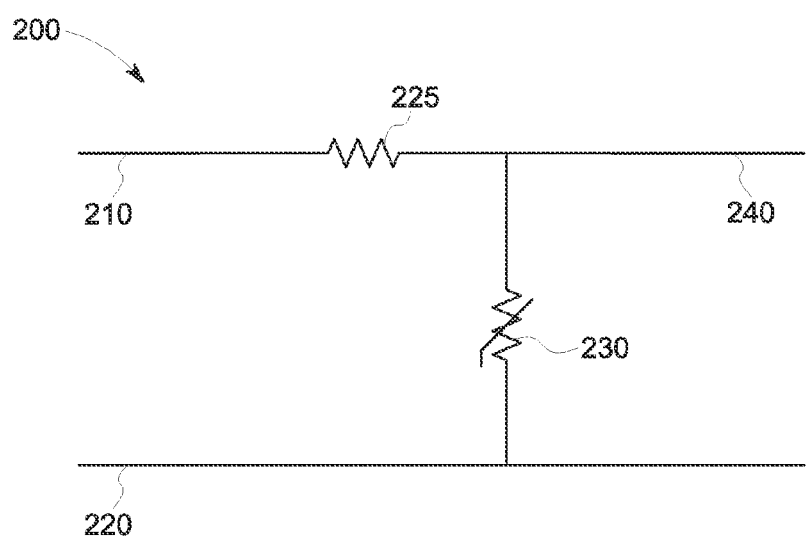
FIG. 2 depicts a schematic of a semiconductor transient protection device in accordance with some embodiments.

FIG. 2 schematically depicts three-terminal semiconductor transient protection device 200 in accordance with some embodiments. Embodying devices include line input 210 and neutral input 220. The neutral input is provided to the lamp's driver electronics mounted on a circuit board.

In series with the line input is thermal element 225, which is depicted as a fusible resistor in FIG. 2. The invention is not so limited, and other thermal elements which offer protection to high current conditions can also be implemented in semiconductor transient protection device 200. The thermal element limits current into the MOV or into the electronics protected in series with it, which can make the product safer and allow for reduced size of the lamp's internal electronics.

Semiconductor element 230 can be a two terminal device connected between the neutral line to the lamp and protected line input 240. Semiconductor element 230 is depicted as a metal oxide varistor in FIG. 2. The invention is not so limited, and other semiconductor elements can also be implemented in semiconductor transient protection device 200. One side of thermal link is connected at the junction of the semiconductor element and the protected line input.

Figure 3A:
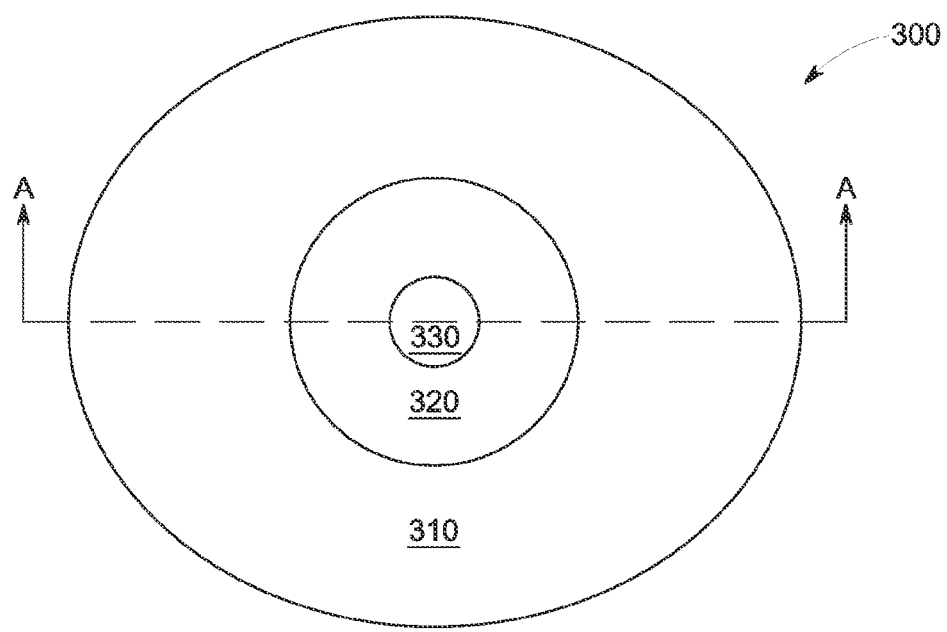
FIG. 3A is a bottom view of semiconductor transient protection device in accordance with some embodiments.
Figure 3B:
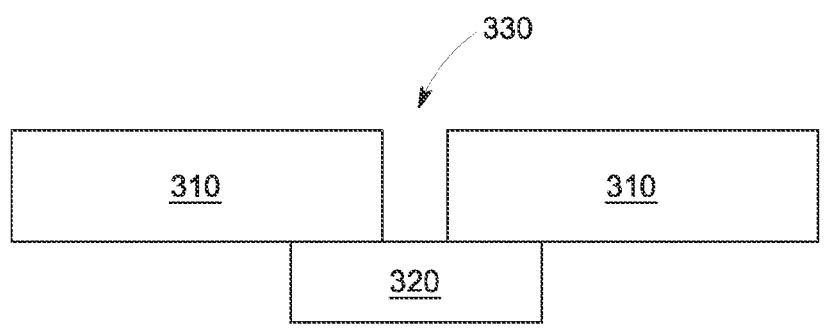
FIG. 3B is a cross-sectional view of the semiconductor transient protection device of FIG. 3A along line A-A.

FIG. 3A is a bottom view of three-terminal semiconductor transient protection device 300 in accordance with some embodiments. FIG. 3B is a cross-sectional view of three-terminal semiconductor transient protection device 300 along line A-A. The three-terminal semiconductor transient protection device includes semiconductor element 310 (e.g., a MOV, a TVS diode, etc.) across the output lines connected to the lamp's electronics and thermal element 320 (e.g., a fusible resistor, etc.) in series with the line voltage input. A lead-in wire (FIG. 4B; item 460) passes through central aperture 330 of the three-terminal semiconductor device to connect the junction of the thermal element and the semiconductor element with the line input of the electronic drive circuitry.

Embodying devices can be constructed so that the semiconductor element is in contact with the neutral contact—i.e., a conductive metal-shell surface area around the circumference of the lamp base. The thermal link would be positioned to be in contact with the line contact of the lamp base, which is located at the bottom center of the lamp base. Embodying devices can be configured to accommodate a three-way lamp base having one neutral contact and two line contacts.

Figure 4A:
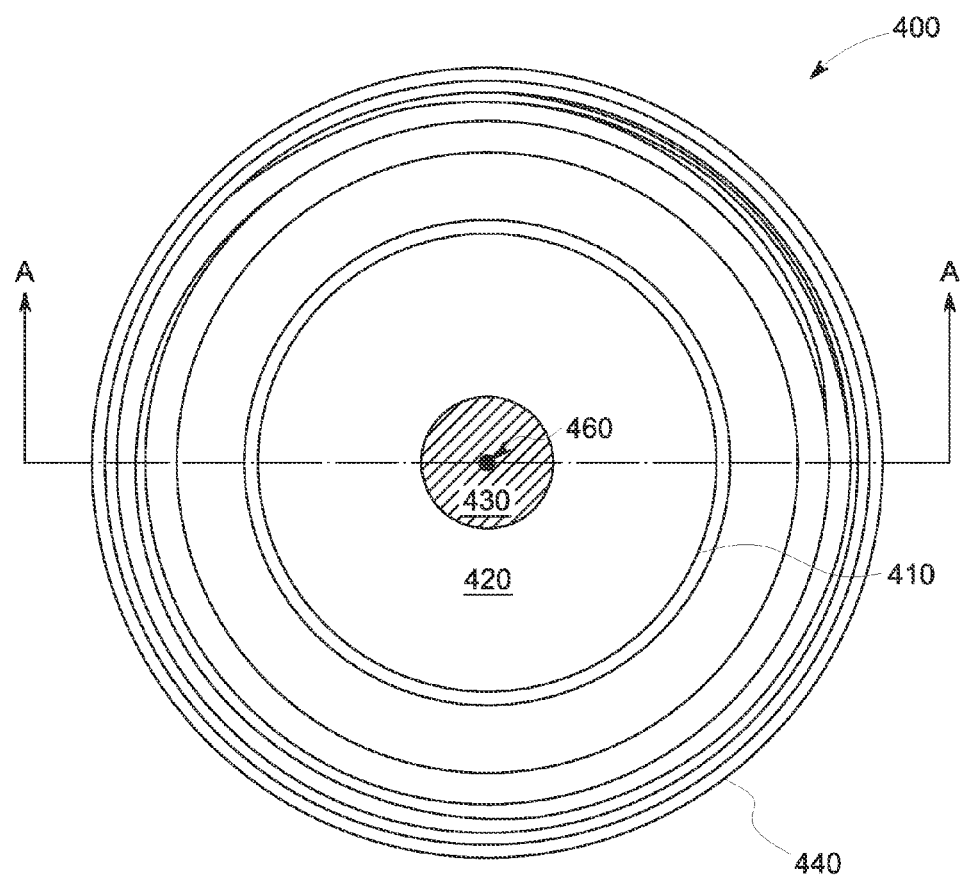
FIG. 4A is a plan view of a lamp base having a semiconductor transient protection device in accordance with some embodiments.
Figure 4B:
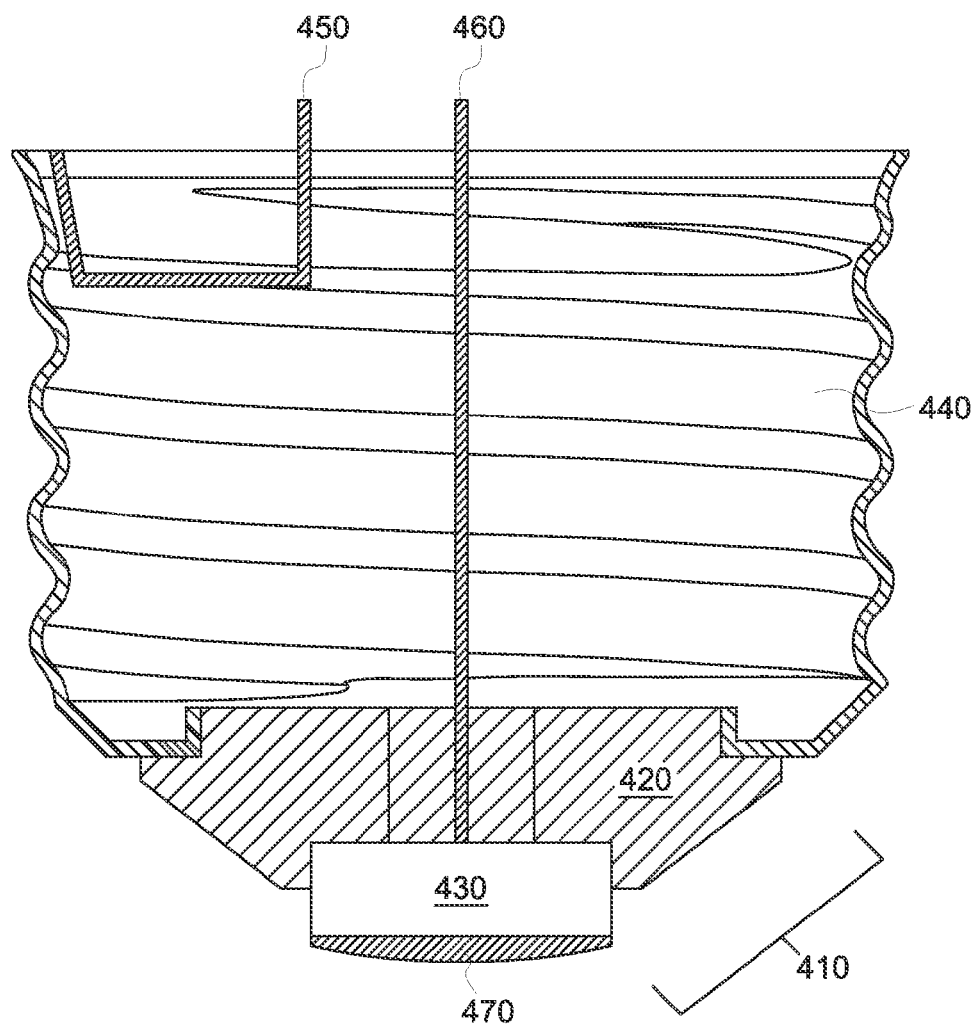
FIG. 4B is a cross-sectional view of the lamp base of FIG. 4A along line A-A.

FIG. 4A is a plan view of lamp base 400 having three-terminal semiconductor transient protection device 410 in accordance with some embodiments. FIG. 4B is a cross-sectional view of lamp base 400 along line A-A. In accordance with embodiments, three-terminal semiconductor transient protection device 410 includes semiconductor element 420 and thermal element 430.

Semiconductor element 420 is in electrical and mechanical contact with conductive metal-shell, neutral contact 440 of the lamp base. The semiconductor element is also in contact with the thermal element. Thermal element is in electrical and mechanical contact with line contact 470 of the lamp base.

In accordance with embodiments, connection between the lamp base neutral contact and the neutral input of the driver circuit can be achieved by conductive mechanical connection to the conductive metal shell itself. In one embodiment, extending from neutral contact 440 is lead-in wire 450 which connects with a neutral line input of an electronic driver circuit within the lamp base. Extending from the thermal element is lead-in wire 460, which provides a protected line input to the electronic driver circuit.

By locating the semiconductor transient protection device as an integral component of the lamp base (as the isolator between the neutral and line inputs), embodying devices may provide additional safety features to contain any spark, or flame, caused by the failure mode of the semiconductor element. The thermal element, which is implemented as a fusible link, enhances these safety features by opening the line input circuit at a predetermined $I^2T$ level within the lamp base.

Embodying devices, which incorporate the semiconductor transient protection device as an integral component of a lamp base during manufacture may remove the need to incorporate a surge protection circuit in the driver circuitry of the electronic circuit board, which can save both space on the driver circuit board and reduce its manufacturing cost.

The transient protection circuitry is among the largest volume components of many lamp designs. Having the protection circuitry built-in to the lamp base for CFL and LED lamps achieves cost and volume reductions. Further, an embodying semiconductor transient protection device can provide a more reliable lamp with fewer field returns.

In some implementations a CFL and/or a LED lamp can include an embodying lamp base with built-in protection circuitry. The embodying lamp base can include a neutral contact having a first conductive metal surface, a line contact having a second conductive metal surface, a semiconductor transient protection device having three terminals, the semiconductor transient protection device formed as an integral component of the lamp base, a first terminal of the semiconductor transient protection device in mechanical and electrical contact with the neutral contact, a second terminal of the semiconductor transient protection device in mechanical and electrical contact with the line contact, a third terminal of the semiconductor transient protection device in electrical contact with a lead-in wire, a thermal element in series with the first terminal and the third terminal, the third terminal being a surface of the thermal element, a two-terminal semiconductor element in electrical connection with the first terminal and the third terminal, the two-terminal semiconductor element having an aperture in which the lead-in wire is located, and the semiconductor transient protection device configured to isolate the line contact from the neutral contact during a first line voltage input, and to provide a low-resistance shunt path between the line contact and the neutral contact during a second line voltage input.

Although specific hardware has been described herein, note that any number of other configurations may be provided in accordance with embodiments of the invention.

Thus, while there have been shown, described, and pointed out fundamental novel features of the invention, it will be understood that various omissions, substitutions, and changes in the form and details of the illustrated embodiments, and in their operation, may be made by those skilled in the art without departing from the spirit and scope of the invention. Substitutions of elements from one embodiment to another are also fully intended and contemplated. The invention is defined solely with regard to the claims appended hereto, and equivalents of the recitations therein.

The invention claimed is:

1. A lamp base comprising:
   a neutral contact including a first conductive metal surface;
   a line contact including a second conductive metal surface;
   a semiconductor transient protection device having three terminals, the semiconductor transient protection device formed as an integral component of the lamp base;
   a first terminal of the semiconductor transient protection device in mechanical and electrical contact with the neutral contact;
   a second terminal of the semiconductor transient protection device in mechanical and electrical contact with the line contact;
   a third terminal of the semiconductor transient protection device in electrical contact with a lead-in wire;
   a thermal element in series with the first terminal and the lead-in wire, the third terminal being a surface of the thermal element;
   a two-terminal semiconductor element in electrical connection with the first terminal and the second terminal, the two-terminal semiconductor element having an aperture in which the lead-in wire is located; and
   the semiconductor transient protection device configured to isolate the line contact from the neutral contact during a first line voltage input, and to provide a low-resistance shunt path between the line contact and the neutral contact during a second line voltage input.

2. The lamp base of claim 1, the thermal element being a fusible resistor.

3. The lamp base of claim 1, the two-terminal semiconductor element being a metal oxide varistor.

4. The lamp base of claim 1, the two-terminal semiconductor element being a transient voltage suppression diode.

5. The lamp base of claim 1, the lamp base being a part of a light emitting diode lamp.

6. The lamp base of claim 5, the lead-in wire connected to an electronic driver circuit of the light emitting diode lamp.

7. The lamp base of claim 1, the lamp base being a part of a compact fluorescent lamp.

8. The lamp base of claim 7, the lead-in wire connected to an electronic driver circuit of the compact fluorescent lamp.

9. The lamp base of claim 1, the lead-in wire in connection with the third terminal at a junction of the thermal element and the two-terminal semiconductor element.

* * * * *